United States Patent
De Vegt et al.

(10) Patent No.: US 11,924,707 B2
(45) Date of Patent: Mar. 5, 2024

(54) SENSOR DATA FOR RANGING PROCEDURE

(71) Applicant: QUALCOMM Incorporated, San Diego, CA (US)

(72) Inventors: Rolf De Vegt, San Francisco, CA (US); Xiaoxin Zhang, Sunnyvale, CA (US); Peyman Siyari, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 17/487,979

(22) Filed: Sep. 28, 2021

(65) Prior Publication Data

US 2023/0106576 A1  Apr. 6, 2023

(51) Int. Cl.
*H04W 4/02* (2018.01)
*H04W 4/40* (2018.01)
*H04W 12/037* (2021.01)

(52) U.S. Cl.
CPC ........... *H04W 4/023* (2013.01); *H04W 4/026* (2013.01); *H04W 4/027* (2013.01); *H04W 4/40* (2018.02); *H04W 12/037* (2021.01)

(58) Field of Classification Search
CPC ..... H04W 4/023; H04W 4/40; H04W 12/037; H04W 4/026; H04W 4/027
See application file for complete search history.

(56) References Cited

U.S. PATENT DOCUMENTS

| | | | |
|---|---|---|---|
| 10,742,449 B1 * | 8/2020 | Avner | H04L 25/0222 |
| 2016/0255463 A1 | 9/2016 | Das et al. | |
| 2016/0277196 A1 * | 9/2016 | Jose | G01S 13/765 |
| 2018/0091949 A1 * | 3/2018 | Steiner | H04W 4/027 |
| 2018/0234797 A1 * | 8/2018 | Ledvina | H04W 4/023 |
| 2019/0274130 A1 * | 9/2019 | Cheng | H04W 4/40 |
| 2020/0015038 A1 * | 1/2020 | Burugupalli | H04W 4/023 |
| 2020/0108786 A1 * | 4/2020 | Yu | G06V 20/593 |
| 2020/0132829 A1 * | 4/2020 | Jiang | H04W 4/40 |
| 2020/0314651 A1 | 10/2020 | Pirch et al. | |

(Continued)

FOREIGN PATENT DOCUMENTS

WO  2018102130 A1  6/2018

OTHER PUBLICATIONS 802.11 Working Group of LAN/WAN Standard Committee of the IEEE: "Part 11: Wireless LAN Medium Access Control (MAC) and Physical Layer (PHY) Specifications, Amendment 4: Enhancements for Positioning", IEEE P802.11az/D3.0, IEEE-SA, Piscataway, NJ USA, vol. 802.11az Drafts, No. D3.0, Jan. 27, 2021, 269 Pages, XP068180460.

(Continued)

*Primary Examiner* — Ernest G Tacsik
(74) *Attorney, Agent, or Firm* — MG-IP Law, P.C.

(57) ABSTRACT

Disclosed are techniques for wireless communication. In an aspect, a first UE and a second UE perform a ranging procedure which includes communication of one or more ranging signals between the first UE and the second UE. The first UE obtains sensor data via a set of sensors coupled to the first UE, and transmits the sensor data to the second UE in association with the ranging procedure. The second UE determines a distance between the first UE and the second UE based on ranging measurement data associated with the one or more ranging signals and the sensor data.

48 Claims, 11 Drawing Sheets

(56) References Cited

U.S. PATENT DOCUMENTS

2021/0014308 A1\* 1/2021 Larsson ................. G06F 21/44
2021/0176230 A1\* 6/2021 Cho .................... H04W 12/069
2021/0218527 A1\* 7/2021 Li .......................... H04L 5/001
2022/0072991 A1\* 3/2022 Jeong .................. H04B 17/318

OTHER PUBLICATIONS

International Search Report and Written Opinion—PCT/US2022/075748—ISA/EPO—dated Nov. 25, 2022.

\* cited by examiner

SENSOR DATA FOR RANGING PROCEDURE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a first user equipment (UE) includes performing a ranging procedure with a second UE, the ranging procedure comprising communication of one or more ranging signals between the first UE and the second UE; obtaining sensor data via a set of sensors coupled to the first UE; and transmitting the sensor data to the second UE in association with the ranging procedure.

In an aspect, a method of operating a second user equipment (UE) includes performing a ranging procedure with a first UE, the ranging procedure comprising communication of one or more ranging signals between the first UE and the second UE; receiving sensor data from the first UE in association with the ranging procedure; and determining a distance between the first UE and the second UE based on ranging measurement data associated with the one or more ranging signals and the sensor data.

In an aspect, a first user equipment (UE) includes a memory; at least one transceiver; and at least one processor communicatively coupled to the memory and the at least one transceiver, the at least one processor configured to: perform a ranging procedure with a second UE, the ranging procedure comprising communication of one or more ranging signals between the first UE and the second UE; obtain sensor data via a set of sensors coupled to the first UE; and transmit, via the at least one transceiver, the sensor data to the second UE in association with the ranging procedure.

In an aspect, a second user equipment (UE) includes a memory; at least one transceiver; and at least one processor communicatively coupled to the memory and the at least one transceiver, the at least one processor configured to: perform a ranging procedure with a first UE, the ranging procedure comprising communication of one or more ranging signals between the first UE and the second UE; receive, via the at least one transceiver, sensor data from the first UE in association with the ranging procedure; and determine a distance between the first UE and the second UE based on ranging measurement data associated with the one or more ranging signals and the sensor data.

In an aspect, a first user equipment (UE) includes means for performing a ranging procedure with a second UE, the ranging procedure comprising communication of one or more ranging signals between the first UE and the second UE; means for obtaining sensor data via a set of sensors coupled to the first UE; and means for transmitting the sensor data to the second UE in association with the ranging procedure.

In an aspect, a second user equipment (UE) includes means for performing a ranging procedure with a first UE, the ranging procedure comprising communication of one or more ranging signals between the first UE and the second UE; means for receiving sensor data from the first UE in association with the ranging procedure; and means for determining a distance between the first UE and the second UE based on ranging measurement data associated with the one or more ranging signals and the sensor data.

In an aspect, a non-transitory computer-readable medium storing computer-executable instructions that, when executed by a first user equipment (UE), cause the first UE to: perform a ranging procedure with a second UE, the ranging procedure comprising communication of one or more ranging signals between the first UE and the second UE; obtain sensor data via a set of sensors coupled to the first UE; and transmit the sensor data to the second UE in association with the ranging procedure.

In an aspect, a non-transitory computer-readable medium storing computer-executable instructions that, when executed by a second user equipment (UE), cause the second UE to: perform a ranging procedure with a first UE, the ranging procedure comprising communication of one or more ranging signals between the first UE and the second UE; receive sensor data from the first UE in association with the ranging procedure; and determine a distance between the first UE and the second UE based on ranging measurement data associated with the one or more ranging signals and the sensor data.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
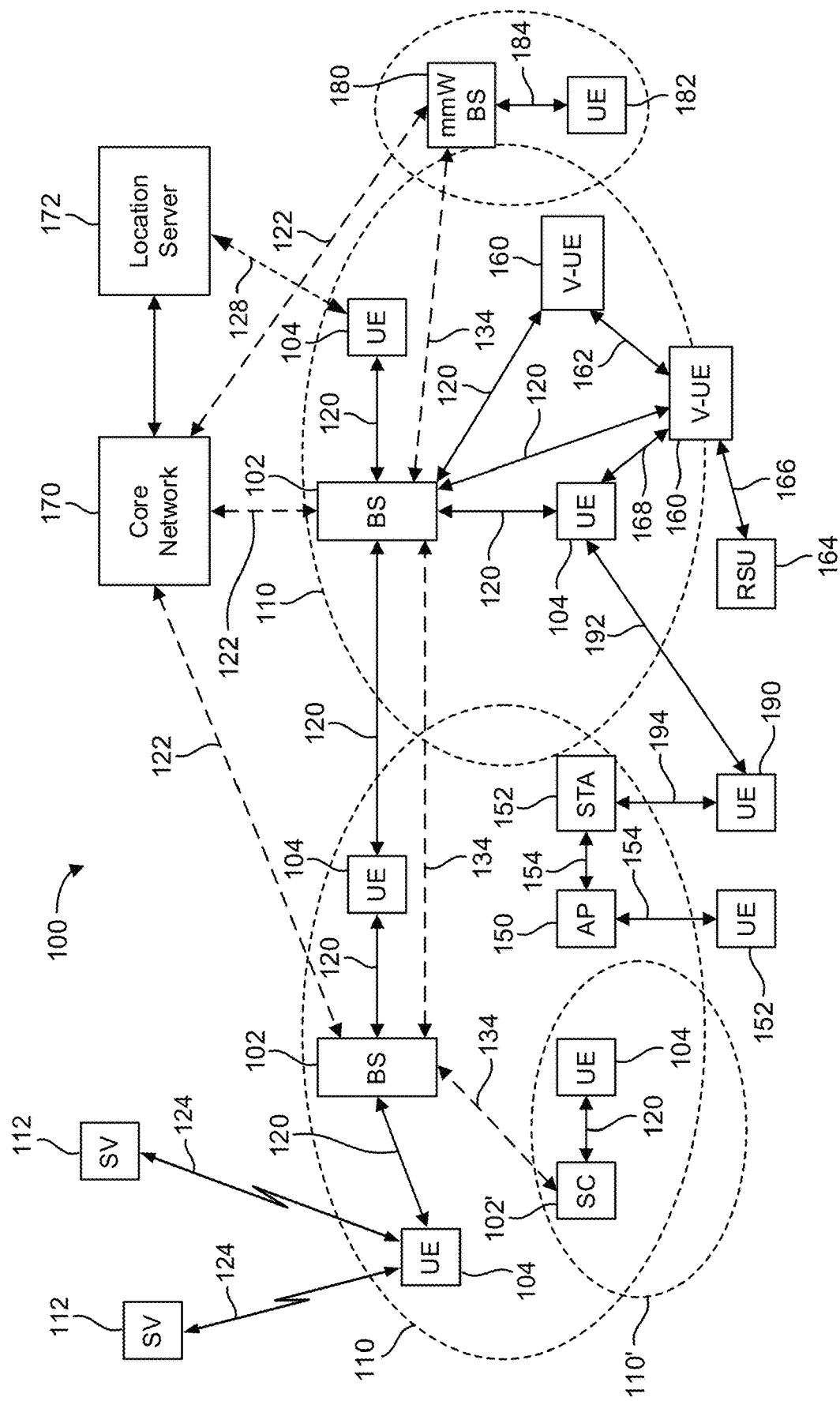
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (VUE), "pedestrian UE" (PUE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A VUE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a VUE may be a portable wireless communication device (e.g., a cell phone, tablet computer, etc.) that is carried by the driver of the vehicle or a passenger in the vehicle. The term "VUE" may refer to the in-vehicle wireless communication device or the vehicle itself, depending on the context. A PUE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple VUEs 160 that may communicate with base stations 102 over communication links 120 using the Uu interface (i.e., the air interface between a UE and a base station). VUEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of VUEs 160 utilizing sidelink communications may be within the geographic coverage area 110 of a base station 102. Other VUEs 160 in such a group may be outside the geographic coverage area 110 of a base station 102 or be otherwise unable to receive transmissions from a base station 102. In some cases, groups of VUEs 160 communicating via sidelink communications may utilize a one-to-many (1:M) system in which each VUE 160 transmits to every other VUE 160 in the group. In some cases, a base station 102 facilitates the scheduling of resources for sidelink communications. In other cases, sidelink communications are carried out between VUEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the VUEs 160 are referred to as V2V communications, communications between the VUEs 160 and the one or more RSUs 164 are referred to as V2I communications, and communications between the VUEs 160 and one or more UEs 104 (where the UEs 104 are PUEs) are referred to as V2P communications. The V2V communications between VUEs 160 may include, for example, information about the position, speed, acceleration, heading, and other vehicle data of the VUEs 160. The V2I information received at a VUE 160 from the one or more RSUs 164 may include, for example, road rules, parking automation information, etc. The V2P communications between a VUE 160 and a UE 104 may include information about, for example, the position, speed, acceleration, and heading of the VUE 160 and the position, speed (e.g., where the UE 104 is carried by a user on a bicycle), and heading of the UE 104.

Note that although FIG. 1 only illustrates two of the UEs as VUEs (VUEs 160), any of the illustrated UEs (e.g., UEs 104, 152, 182, 190) may be VUEs. In addition, while only the VUEs 160 and a single UE 104 have been illustrated as being connected over a sidelink, any of the UEs illustrated in FIG. 1, whether VUEs, PUEs, etc., may be capable of sidelink communication. Further, although only UE 182 was described as being capable of beam forming, any of the illustrated UEs, including VUEs 160, may be capable of beam forming. Where VUEs 160 are capable of beam forming, they may beam form towards each other (i.e., towards other VUEs 160), towards RSUs 164, towards other UEs (e.g., UEs 104, 152, 182, 190), etc. Thus, in some cases, VUEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
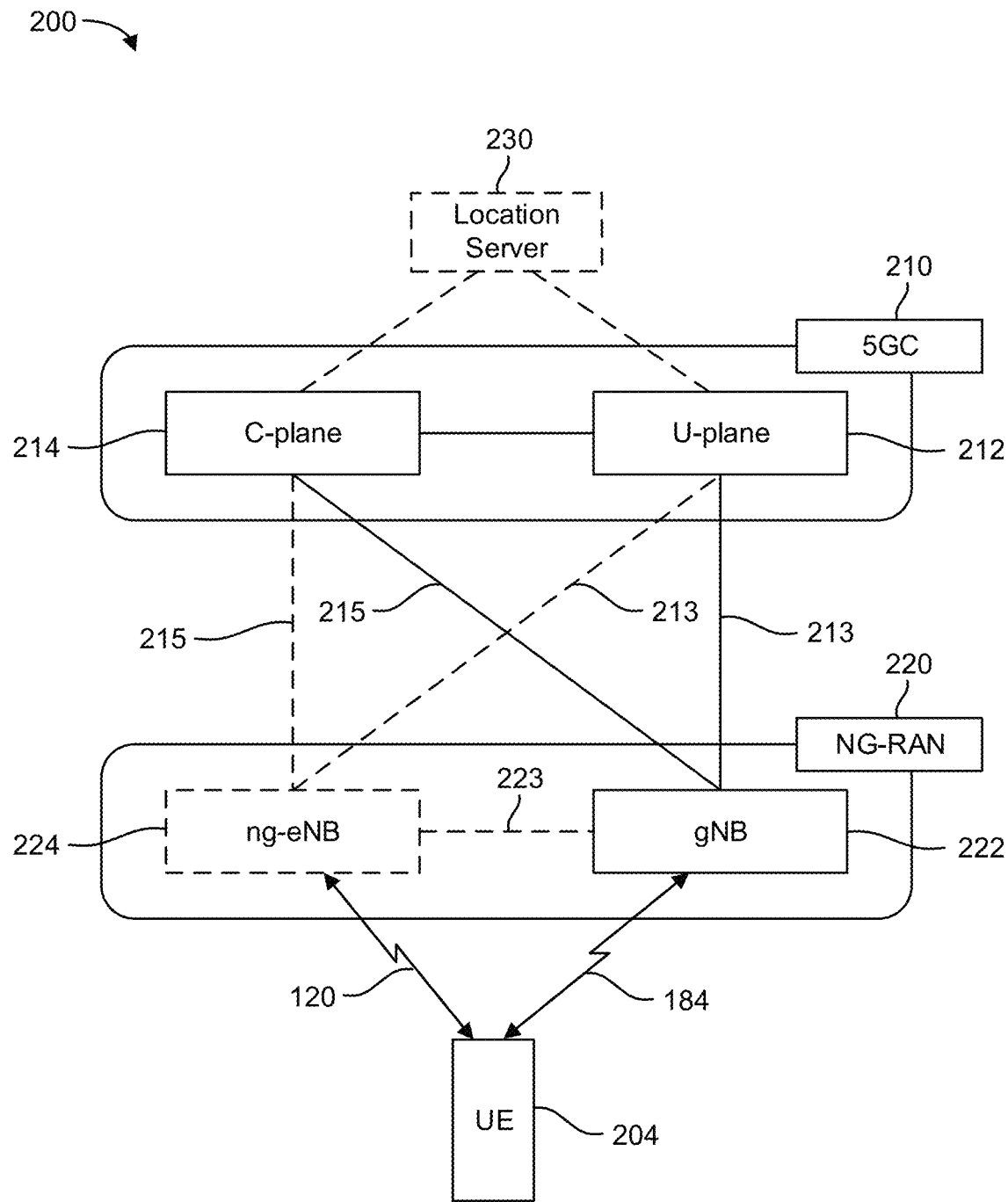
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
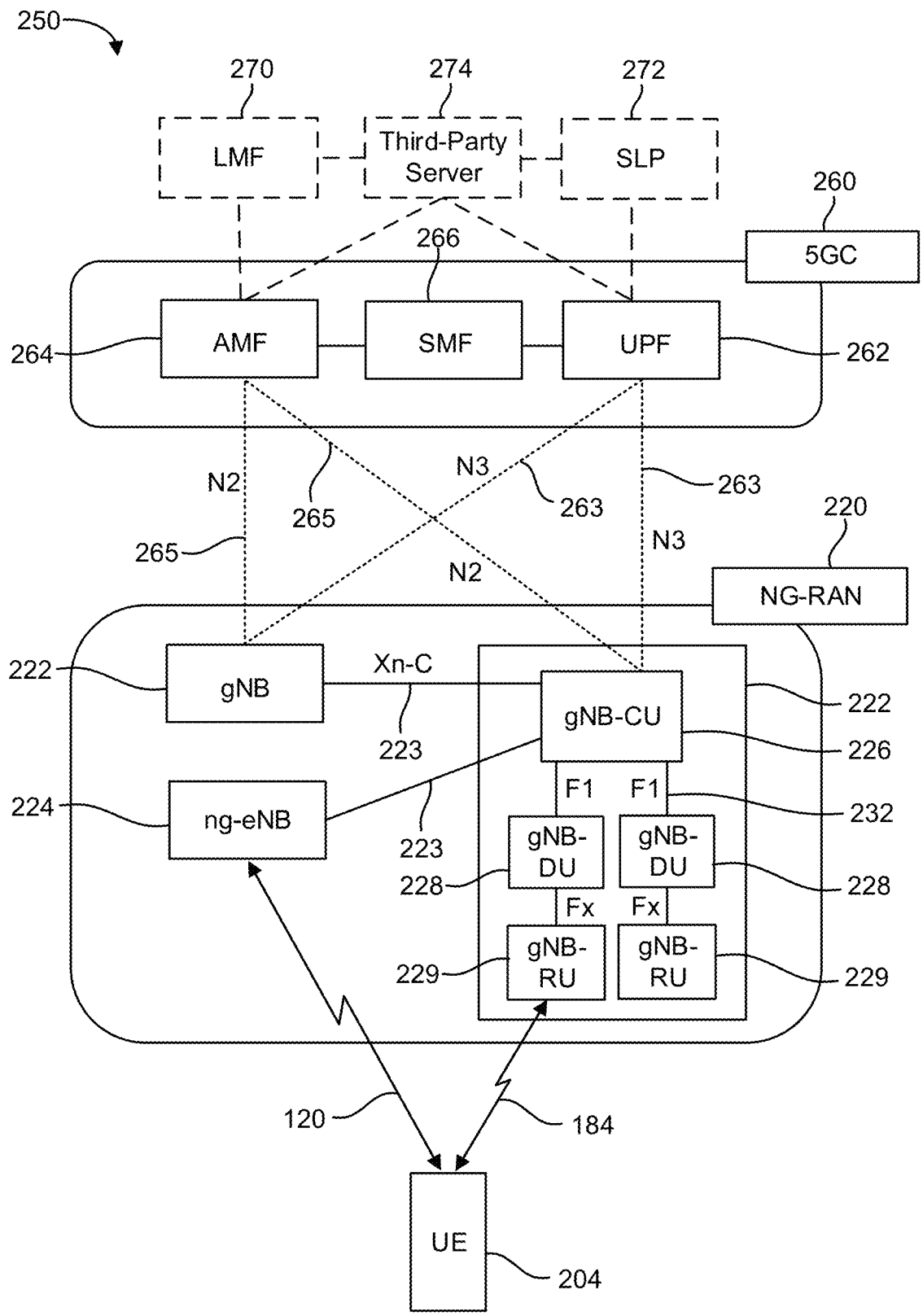

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
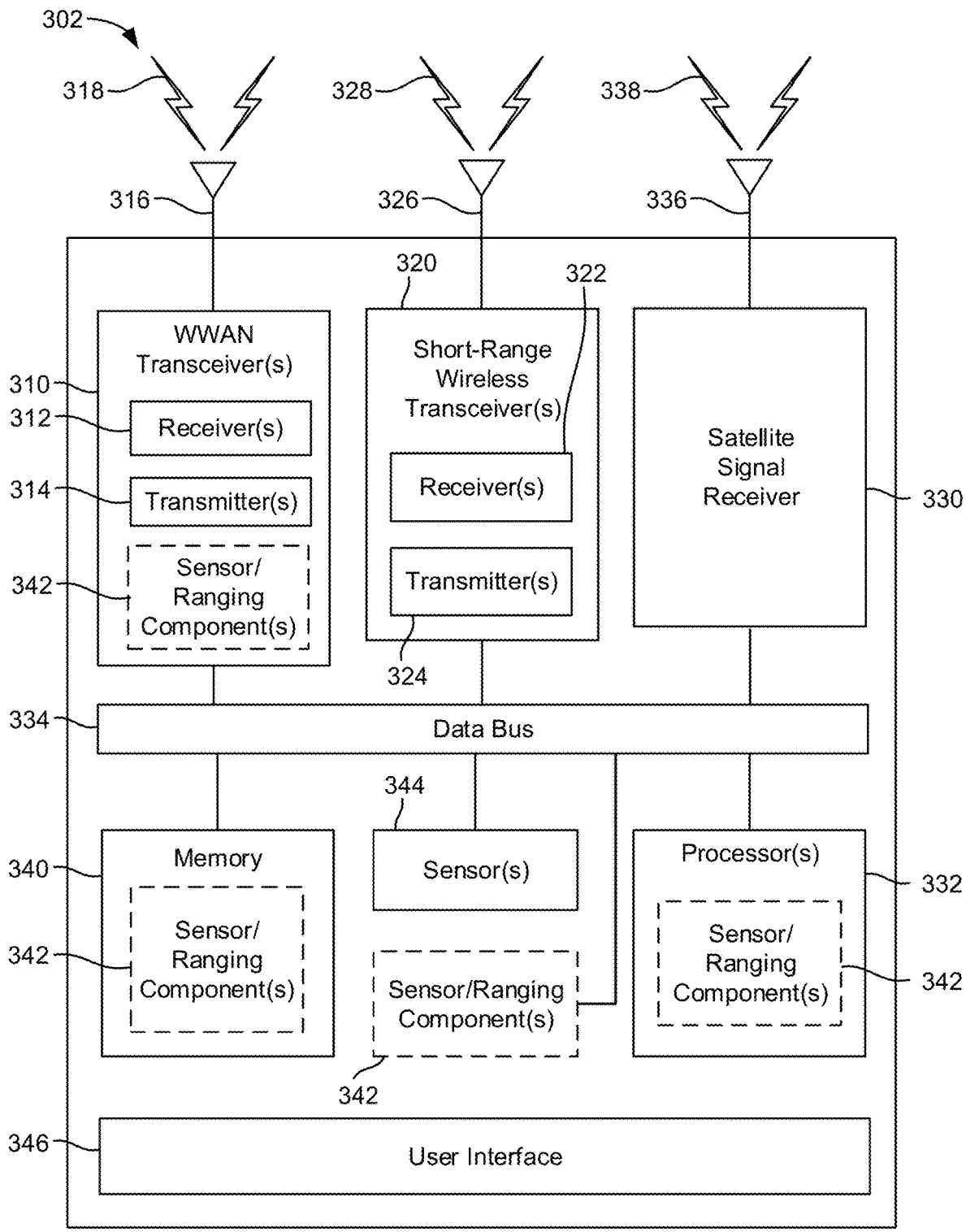
FIGS. 3A, 3B, and 3C are simplified block diagrams of several sample aspects of components that may be employed in a user equipment (UE), a base station, and a network entity, respectively, and configured to support communications as taught herein.
Figure 3B:
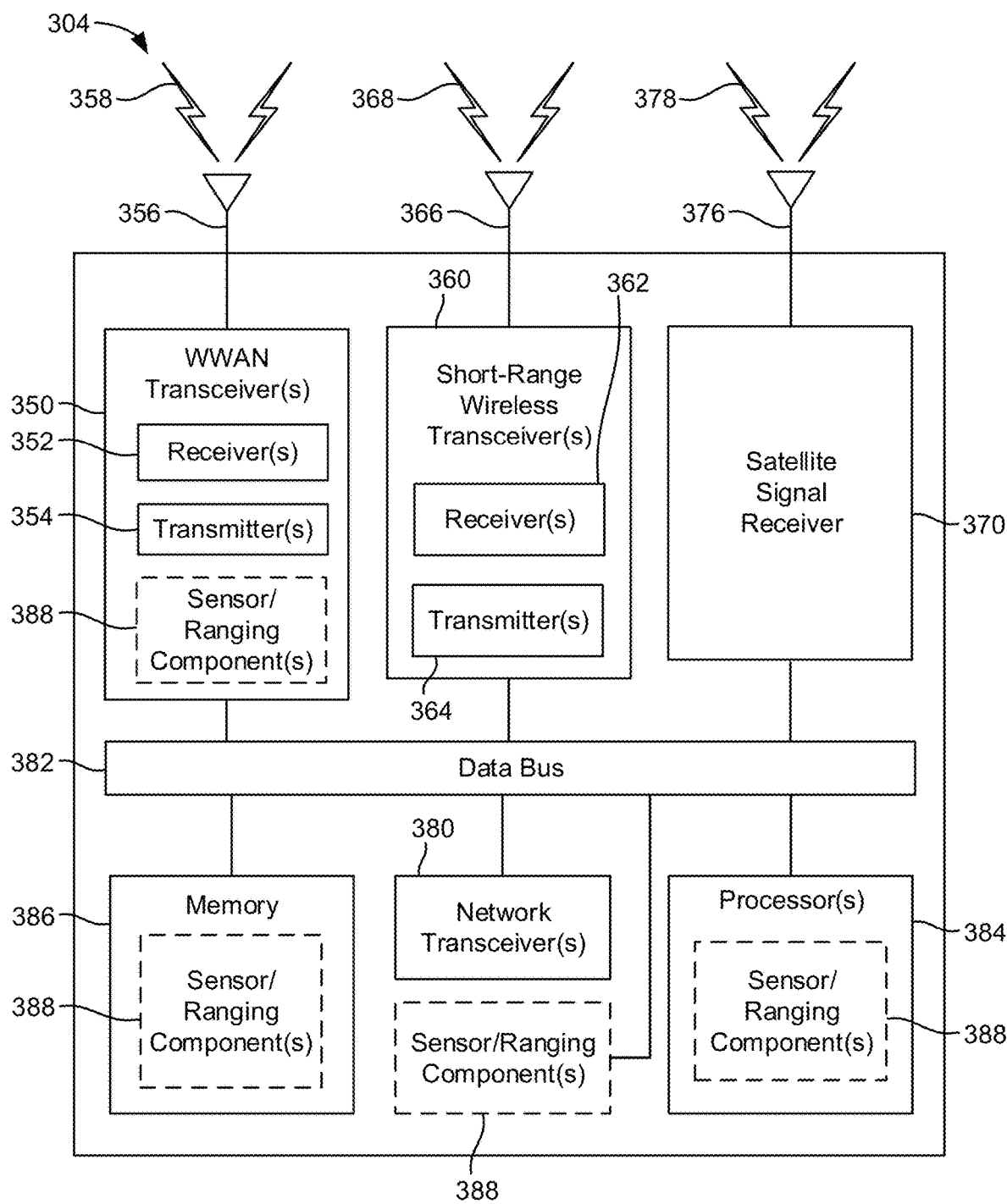
Figure 3C:
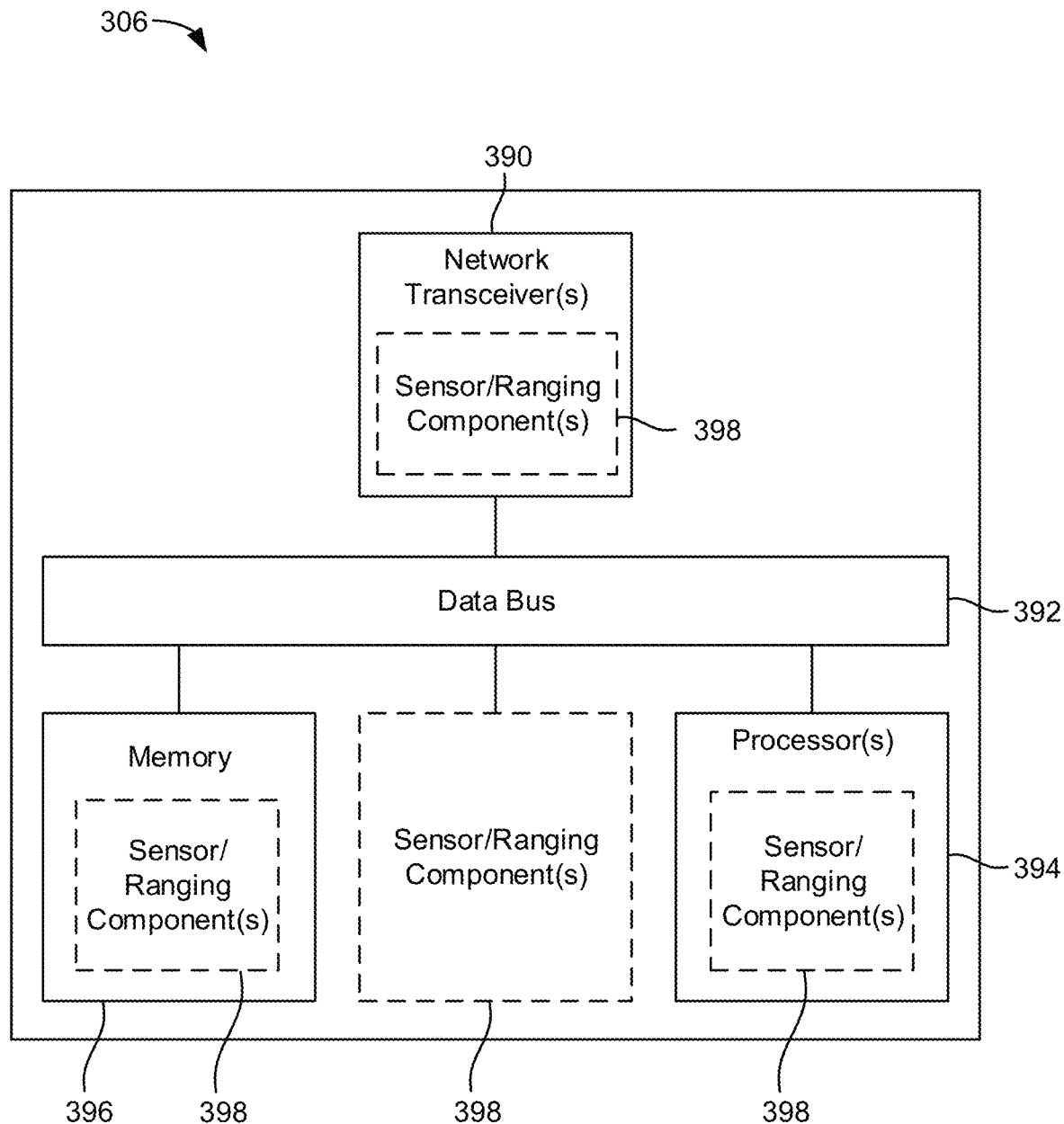

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sensor/ranging component(s) 342, 388, and 398, respectively. The sensor/ranging component(s) 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sensor/ranging component(s) 342, 388, and 398 may be external to the processors 332, 384, and 394 (e.g., part of a modem processing system, integrated with another processing system, etc.). Alternatively, the sensor/ranging component(s) 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sensor/ranging component(s) 342, which may be, for example, part of the one or more WWAN transceivers 310, the memory 340, the one or more processors 332, or any combination thereof, or may be a standalone component. FIG. 3B illustrates possible locations of the sensor/ranging component(s) 388, which may be, for example, part of the one or more WWAN transceivers 350, the memory 386, the one or more processors 384, or any combination thereof, or may be a standalone component. FIG. 3C illustrates possible locations of the sensor/ranging component(s) 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sensor/ranging component(s) 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
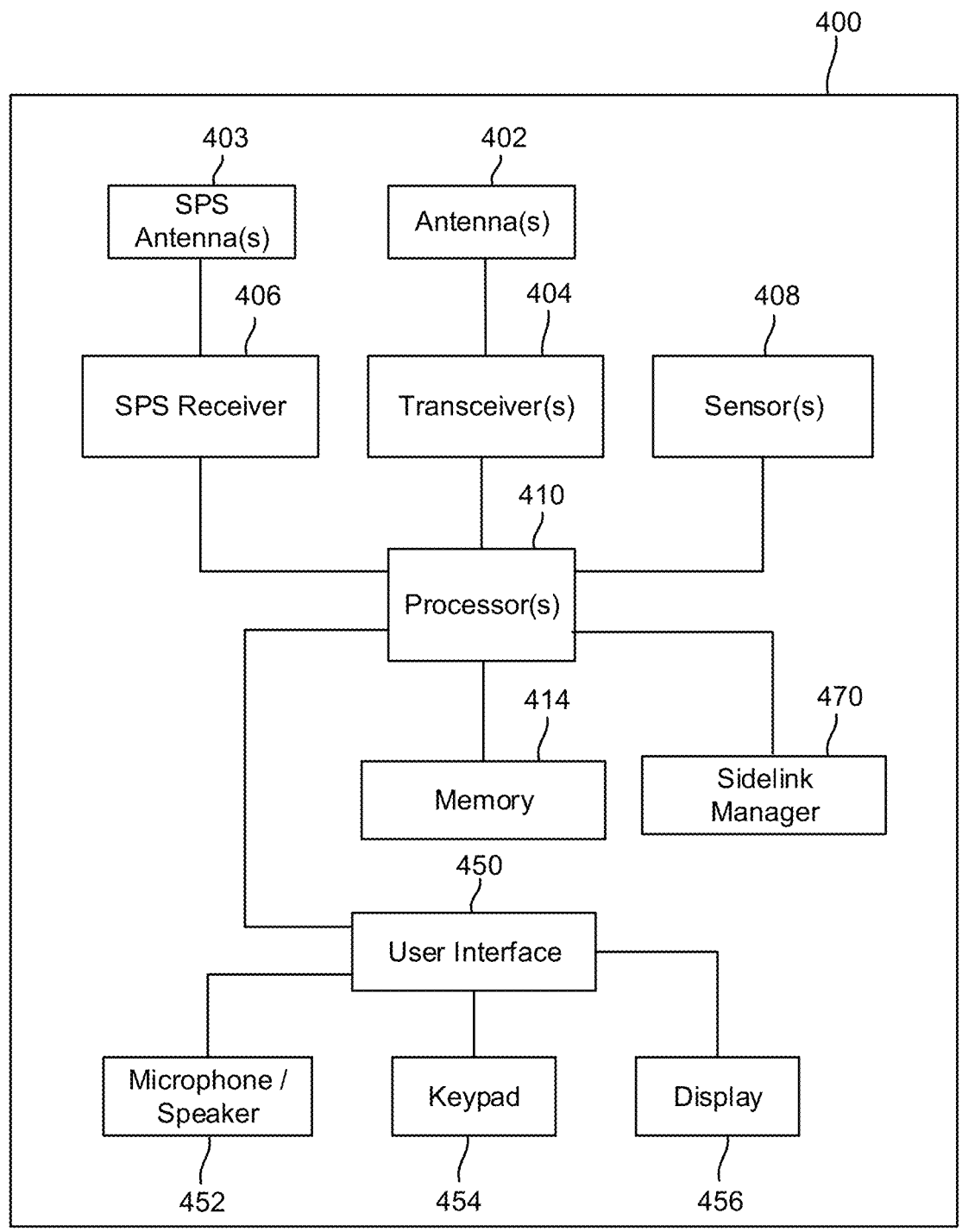
FIG. 4 is a block diagram illustrating various components of an example user equipment (UE), according to aspects of the disclosure.

FIG. 4 is a block diagram illustrating various components of an example UE 400, according to aspects of the disclosure. In an aspect, the UE 400 may correspond to any of the UEs described herein. As a specific example, the UE 400 may be a VUE, such as VUE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include one or more transceivers 404 connected to one or more antennas 402 and providing means for communicating (e.g., means for transmitting, means for receiving, means for measuring, means for tuning, means for refraining from transmitting, etc.) with other network nodes, such as VUEs (e.g., VUEs 160), infrastructure access points (e.g., roadside access point 164), PUEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The one or more transceivers 404 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, the one or more transceivers 404 and the antenna(s) 402 may form a (wireless) communication interface of the UE 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning system (SPS) receiver 406. The SPS receiver 406 may be connected to the one or more SPS antennas 403 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to one or more processors 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The one or more processors 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The one or more processors 410 may therefore provide means for processing, such as means for determining, means for calculating, means for receiving, means for transmitting, means for indicating, etc. The one or more processors 410 may include any form of logic suitable for performing, or causing the components of the UE 400 to perform, at least the techniques described herein.

The one or more processors 410 may also be coupled to a memory 414 providing means for storing (including means for retrieving, means for maintaining, etc.) data and software instructions for executing programmed functionality within the UE 400. The memory 414 may be on-board the one or more processors 410 (e.g., within the same integrated circuit (IC) package), and/or the memory 414 may be external to the one or more processors 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the one or more processors 410. The sidelink manager 470 may be a hardware, software, or firmware component that, when executed, causes the UE 400 to perform the operations described herein. For example, the sidelink manager 470 may be a software module stored in memory 414 and executable by the one or more processors 410. As another example, the sidelink manager 470 may be a hardware circuit (e.g., an ASIC, a field-programmable gate array (FPGA), etc.) within the UE 400.

The automotive industry is actively working on defining systems that enable passive keyless entry (e.g., Digital Key). The IEEE Digital Key Task Group's pursuit of combining Wi-Fi ranging and the existing Bluetooth (BLE)-based Digital Key Unlock systems shows promising results towards a more secure and more practical keyless entry. Car Connectivity Consortium (CCC) is drafting standard of combining ultra-wideband (UWB) ranging and BLE for passive keyless entry.

Various wireless technologies may be used for Digital Key, including Wi-Fi, UWB, BLE, 5G NR (e.g., sidelink), BLE High Accuracy Distance Measurement (HADM), and so on. One of the challenges Digital Key will be facing is for a car to locate a phone and track phone's movement accurately. To this end, a ranging procedure may be performed for UE location tracking, as shown in FIG. 5.

Figure 5:
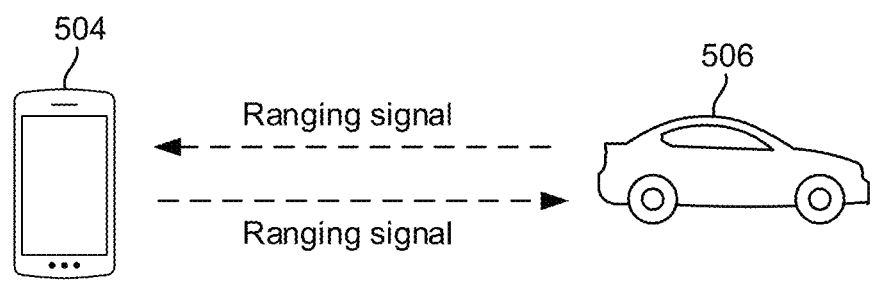
FIG. 5 illustrates an example wireless communication system in which a vehicle user equipment (VUE) is exchanging ranging signals with a pedestrian UE (PUE), according to aspects of the disclosure.

FIG. 5 illustrates an example wireless communication system 500 in which a pedestrian UE (PUE) 504 is exchanging ranging signals with a vehicle UE (VUE) 506, according to aspects of the disclosure. In FIG. 5, a two-way ranging procedure is depicted, whereby PUE 504 transmits a ranging signal to VUE 506, and VUE 506 transmits a ranging signal to PUE 504 (in either order). Each respective UE measures the ranging signal from the other UE, and the ranging measurements may be used to derive the distance between the PUE 504 and VUE 506 (e.g., PUE 504 may report its measurement of the ranging signal from VUE 506 so that VUE 506 may perform the distance derivation, e.g., via Kalman filtering).

Generally, determining a location or distance to another device is more difficult than a device determining its own location. For example, if PUE 504 or VUE 506 wanted to determine its own respective location, then PUE 504 or VUE 506 would have access to its own local sensor data (e.g., its own respective velocity, acceleration, orientation, etc.). For example, Kalman Filtering is widely used for distance tracking, and Kalman Filtering's performance is much improved when acceleration/velocity information is available. However, such sensor data is generally retained locally. Hence, PUE 504 and VUE 506 may each leverage their own local sensor data for location-related operations, but sensor data at PUE 504 would not be used at VUE 506 to assist in ranging, as an example.

Aspects of the disclosure are directed to communication of sensor data from a first UE to a second UE to assist in a ranging procedure performed between the first UE and the second UE. Such aspects may provide various technical advantages, such as facilitating more accurate distance estimation at the second UE in association with the ranging procedure (e.g., the sensor data may be input to Kalman Filtering at the second UE).

Figure 6:
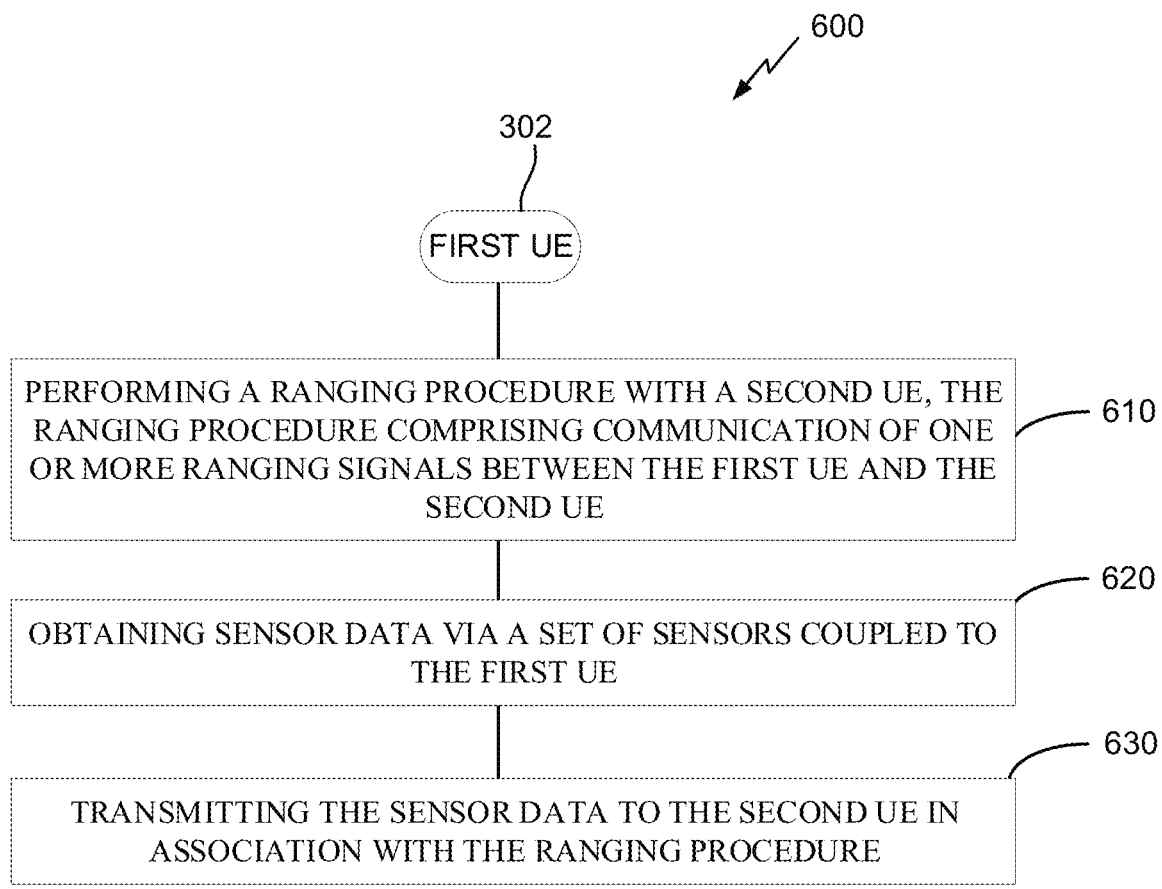
FIG. 6 illustrates an exemplary process of communications according to an aspect of the disclosure.

FIG. 6 illustrates an exemplary process 600 of communications according to an aspect of the disclosure. The process 600 of FIG. 6 is performed by a first UE, such as UE 302 or UE 400.

Referring to FIG. 6, at 610, the first UE (e.g., receiver 312 or 322, transmitter 314 or 324, antenna(s) 402, sensor/ranging component(s) 342, processor(s) 332 or 410, etc.) performs a ranging procedure with a second UE, the ranging procedure including communication of one or more ranging signals between the first UE and the second UE. In some designs, the ranging procedure may be performed over a period of time (e.g., ranging signals may be sent between the first and second UEs periodically to continually track an associated distance, etc.).

Referring to FIG. 6, at 620, the first UE (e.g., sensor(s) 344 or 408, sensor/ranging component(s) 342, processor(s) 332 or 410, etc.) obtains sensor data via a set of sensors coupled to the first UE. As will be described in more detail below, the sensor data may include one or more of a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Referring to FIG. 6, at 630, the first UE (e.g., transmitter 314 or 324, antenna(s) 402, etc.) transmits the sensor data to the second UE in association with the ranging procedure. In some designs, one of the ranging signal(s) of the ranging procedure at 610 may be used to transport the sensor data at 630.

Figure 7:
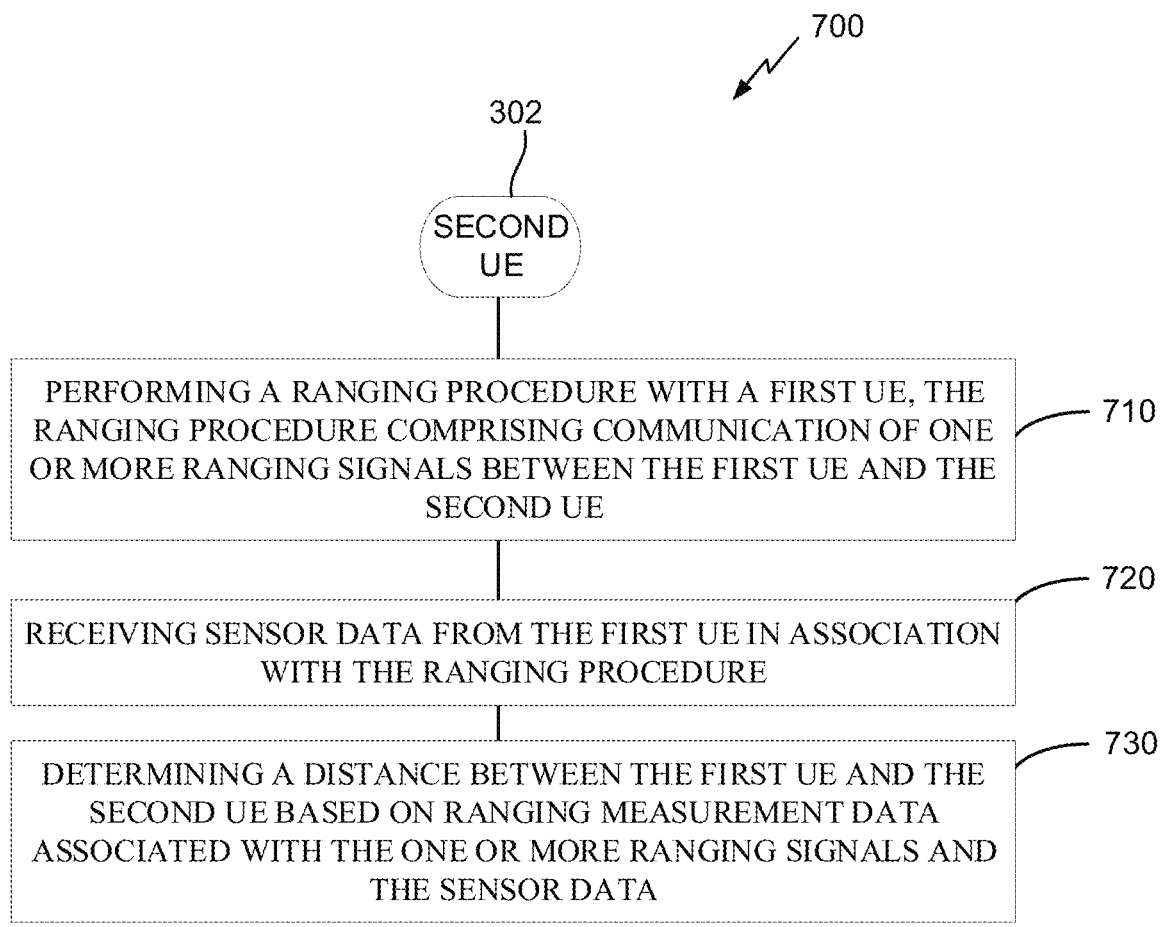
FIG. 7 illustrates an exemplary process of communications according to an aspect of the disclosure.

FIG. 7 illustrates an exemplary process 700 of communications according to an aspect of the disclosure. The process 700 of FIG. 7 is performed by a second UE, such as UE 302 or UE 400.

Referring to FIG. 7, at 710, the second UE (e.g., receiver 312 or 322, transmitter 314 or 324, antenna(s) 402, sensor/ranging component(s) 342, processor(s) 332 or 410, etc.) performs a ranging procedure with a first UE, the ranging procedure including communication of one or more ranging signals between the first UE and the second UE. In some designs, the ranging procedure may be performed over a period of time (e.g., ranging signals may be sent between the first and second UEs periodically to continually track an associated distance, etc.).

Referring to FIG. 7, at 720, the second UE (e.g., receiver 312 or 322, antenna 402, etc.) receives sensor data from the first UE in association with the ranging procedure. As will be described in more detail below, the sensor data may include one or more of a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Referring to FIG. 7, at 730, the second UE (e.g., sensor/ranging component(s) 342, processor(s) 332 or 410, etc.) determines a distance between the first UE and the second UE based on ranging measurement data associated with the one or more ranging signals and the sensor data. In one example, the sensor data may be provided as input to Kalman Filtering to obtain a more precise estimate of a distance between the first UE and the second UE.

Figure 8:
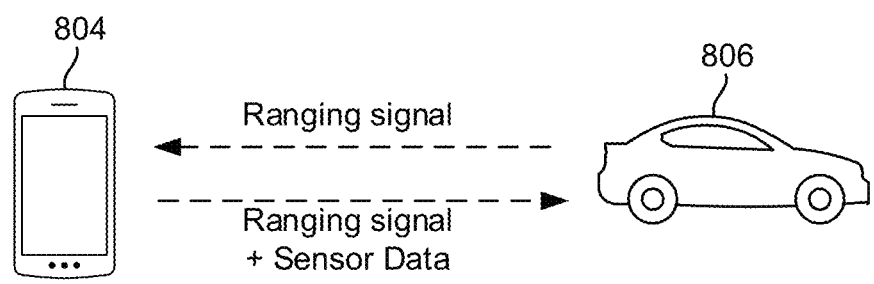
FIG. 8 illustrates an example wireless communication system in which a pedestrian UE (PUE) is exchanging ranging signals with a vehicle UE (VUE), according to an example implementation of the processes of FIGS. 6-7.

Referring to FIGS. 6-7, in some designs, the first UE corresponds to a pedestrian UE (PUE), and the second UE corresponds to a vehicle UE (VUE), as shown in FIG. 8. In some designs, the ranging procedure is associated with a Digital Key procedure.

FIG. 8 illustrates an example wireless communication system 800 in which a pedestrian UE (PUE) 804 is exchanging ranging signals with a vehicle UE (VUE) 806, according to an example implementation of the processes 600-700 of FIGS. 6-7. In FIG. 8, a two-way ranging procedure is depicted, whereby PUE 804 transmits a ranging signal to VUE 806, and VUE 806 transmits a ranging signal to PUE 804 (in either order). Each respective UE measures the ranging signal from the other UE, and the ranging measurements may be used to derive the distance between the PUE 804 and VUE 806. Moreover, unlike FIG. 5, PUE 804 further provides sensor data in addition to the ranging signal (e.g., PUE 804 may report its measurement of the ranging signal from VUE 806 so that PUE 804 may perform the distance derivation based on both ranging signal measurements as well as PUE sensor data, e.g., via Kalman filtering).

Referring to FIGS. 6-7, in some designs, the sensor data is associated with one or more of a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Referring to FIGS. 6-7, in some designs, the sensor data is transmitted via a Bluetooth Low Energy (BLE) secure link, a BLE High Accuracy Distance Measurement (HADM) link, an Ultra Wideband (UWB) link, a Wi-Fi link, or a 5G New Radio (NR) link. As an example, the BLE secure link may provide a high level of security for the sensor data transfer. However, if Wi-Fi or UWB is used for the ranging procedure, then BLE secure link-based transfer will involve an additional transmission beyond those required for the ranging procedure.

Referring to FIGS. 6-7, in some designs, the sensor data is transmitted via an encrypted Ultra Wideband (UWB) frame or an encrypted Wi-Fi frame. As an example, the encrypted UWB frame or encrypted Wi-Fi frame may provide a high level of security for the sensor data transfer. However, if non-encrypted Wi-Fi or UWB is used for the ranging procedure, then the encrypted UWB frame or encrypted Wi-Fi frame will involve an additional transmission beyond those required for the ranging procedure.

Referring to FIGS. 6-7, in some designs, the ranging procedure corresponds to a Fine Timing Measurement (FTM) ranging procedure, and the sensor data is transmitted via an FTM Request frame (e.g., if the first UE is the initiator and the second UE is the responder) or an FTM frame or FTM_1 (e.g., if the second UE is the initiator and the first UE is the responder). This approach is efficient in terms of signaling since the sensor data is 'piggybacked' onto signaling that is already being used for the ranging procedure, but is less secure than other signaling options such as secure BLE, etc.

Referring to FIGS. 6-7, in some designs, the ranging procedure corresponds to an IEEE 802.11az-based ranging procedure, and the sensor data is transmitted via an initial FTM Request (iFTMR) frame (e.g., if the first UE is the initiator and the second UE is the responder) or an initial FTM (iFTM) frame (e.g., if the second UE is the initiator and the first UE is the responder) or a Location Measurement Report (LMR) frame. This approach is efficient in terms of signaling since the sensor data is 'piggybacked' onto signaling that is already being used for the ranging procedure, and also provides a high level of security.

Referring to FIGS. 6-7, in some designs, the transmission of the sensor data is triggered in response to initiating of the ranging procedure. In other designs, the transmission of the sensor data is triggered in response to a distance between the first UE and the second UE being less than a distance threshold. For example, the sensor data may not need to be reported continuously. To save power, in an example, sensor data reporting can start only when Wi-Fi/UWB is triggered to start ranging, e.g., only when BLE indicates close distance (less than a threshold) and triggers Wi-Fi/UWB to start accurate ranging, then the first UE (e.g., PUE) starts reporting sensor data periodically along with ranging measurements to the second UE (e.g., VUE). The second UE may gather both sensor data and Wi-Fi/UWB ranging measurements and performs distance tracking using algorithms such as Kalman Filtering to track distance to the first UE. In some designs, the sensor data includes the first UE's velocity and acceleration, which are important for improving the accuracy and converging speed of distance tracking.

Referring to FIGS. 6-7, in some designs, the second UE may temporally align the ranging measurement data with the sensor data, and the distance is determined at 730 based at least in part on the temporally aligned ranging measurement data and the temporally aligned sensor data. In some designs, the temporal alignment is performed via interpolation or extrapolation of the ranging measurement data, the sensor data, or a combination thereof. In other designs, the temporal alignment is performed via selection of one or more sensor data samples that are within a threshold period of time from one or more ranging measurement samples. In some designs, sensor data also includes timestamps in order to correlate with ranging measurements. Sensor data with timestamps close to corresponding ranging signal measurements may be aligned, or the sensor data, ranging measurements (or both) may be interpolated/extrapolated to a particular point in time and then aligned.

Referring to FIGS. 6-7, in some designs, the distance is determined at 730 based on Kalman filtering. In some designs, a zero input is provided to the Kalman filtering to represent the sensor data when the sensor data is unavailable (e.g., with actual sensor data being plugged into the Kalman filtering as it is received), or different Kalman filtering that does not require sensor data input is implemented when the sensor data is unavailable. For example, when the first and second UEs start to perform the ranging procedure, sensor data may not yet be available. In this case, the lack of sensor data may be factored into the Kalman Filtering as either a zero input, or a switch to a different Kalman Filter which does not need the sensor data as an input at all.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a first user equipment (UE), comprising: performing a ranging procedure with a second UE, the ranging procedure comprising communication of one or more ranging signals between the first UE and the second UE; obtaining sensor data via a set of sensors coupled to the first UE; and transmitting the sensor data to the second UE in association with the ranging procedure.

Clause 2. The method of clause 1, wherein the first UE corresponds to a pedestrian UE (PUE), and wherein the second UE corresponds to a vehicle UE (VUE).

Clause 3. The method of clause 2, wherein the ranging procedure is associated with a Digital Key procedure.

Clause 4. The method of any of clauses 1 to 3, wherein the sensor data is associated with one or more of: a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Clause 5. The method of any of clauses 1 to 4, wherein the sensor data is transmitted via a Bluetooth Low Energy (BLE) secure link, a BLE High Accuracy Distance Measurement (HADM) link, an Ultra Wideband (UWB) link, a Wi-Fi link, or a 5G New Radio (NR) link.

Clause 6. The method of any of clauses 1 to 5, wherein the sensor data is transmitted via an encrypted Ultra Wideband (UWB) frame or an encrypted Wi-Fi frame.

Clause 7. The method of any of clauses 1 to 6, wherein the ranging procedure corresponds to a Fine Timing Measurement (FTM) ranging procedure, and wherein the sensor data is transmitted via an FTM Request frame or an FTM frame.

Clause 8. The method of any of clauses 3 to 7, wherein the ranging procedure corresponds to an IEEE 802.11az-based ranging procedure, and wherein the sensor data is transmitted via an initial FTM Request (iFTMR) frame or an initial FTM (iFTM) frame or a Location Measurement Report (LMR) frame.

Clause 9. The method of any of clauses 1 to 8, wherein the transmission of the sensor data is triggered in response to initiating of the ranging procedure, or wherein the transmission of the sensor data is triggered in response to a distance between the first UE and the second UE being less than a distance threshold.

Clause 10. A method of operating a second user equipment (UE), comprising: performing a ranging procedure with a first UE, the ranging procedure comprising communication of one or more ranging signals between the first UE and the second UE; receiving sensor data from the first UE in association with the ranging procedure; and determining a distance between the first UE and the second UE based on ranging measurement data associated with the one or more ranging signals and the sensor data.

Clause 11. The method of clause 10, further comprising: temporally aligning the ranging measurement data with the sensor data, wherein the distance is determined based at least in part on the temporally aligned ranging measurement data and the temporally aligned sensor data.

Clause 12. The method of clause 11, wherein the temporal alignment is performed via interpolation or extrapolation of the ranging measurement data, the sensor data, or a combination thereof, or wherein the temporal alignment is performed via selection of one or more sensor data samples that are within a threshold period of time from one or more ranging measurement samples.

Clause 13. The method of any of clauses 10 to 12, wherein the distance is determined based on Kalman filtering.

Clause 14. The method of clause 13, wherein a zero input is provided to the Kalman filtering to represent the sensor data when the sensor data is unavailable, or wherein different Kalman filtering that does not require sensor data input is implemented when the sensor data is unavailable.

Clause 15. The method of any of clauses 10 to 14, wherein the first UE corresponds to a pedestrian UE (PUE), and wherein the second UE corresponds to a vehicle UE (VUE).

Clause 16. The method of clause 15, wherein the ranging procedure is associated with a Digital Key procedure.

Clause 17. The method of any of clauses 10 to 16, wherein the sensor data is associated with one or more of: a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Clause 18. The method of any of clauses 10 to 17, wherein the sensor data is received via a Bluetooth Low Energy (BLE) secure link, a BLE High Accuracy Distance Measurement (HADM) link, an Ultra Wideband (UWB) link, a Wi-Fi link, or a 5G New Radio (NR) link.

Clause 19. The method of any of clauses 10 to 18, wherein the sensor data is received via an encrypted Ultra Wideband (UWB) frame or an encrypted Wi-Fi frame.

Clause 20. The method of any of clauses 10 to 19, wherein the ranging procedure corresponds to a Fine Timing Measurement (FTM) ranging procedure, and wherein the sensor data is received via an FTM Request frame or an FTM frame.

Clause 21. The method of clause 20, wherein the ranging procedure corresponds to an IEEE 802.11az-based ranging procedure, and wherein the sensor data is received via an initial FTM Request (iFTMR) frame or an initial FTM (iFTM) frame or a Location Measurement Report (LMR) frame.

Clause 22. The method of clause 21, wherein the reception of the sensor data is triggered in response to initiating of the ranging procedure, or wherein the reception of the sensor data is triggered in response to a distance between the first UE and the second UE being less than a distance threshold.

Clause 23. A first user equipment (UE), comprising: a memory; at least one transceiver; and at least one processor communicatively coupled to the memory and the at least one transceiver, the at least one processor configured to: perform a ranging procedure with a second UE, the ranging procedure comprising communication of one or more ranging signals between the first UE and the second UE; obtain sensor data via a set of sensors coupled to the first UE; and transmit, via the at least one transceiver, the sensor data to the second UE in association with the ranging procedure.

Clause 24. The first UE of clause 23, wherein the first UE corresponds to a pedestrian UE (PUE), and wherein the second UE corresponds to a vehicle UE (VUE).

Clause 25. The first UE of clause 24, wherein the ranging procedure is associated with a Digital Key procedure.

Clause 26. The first UE of any of clauses 23 to 25, wherein the sensor data is associated with one or more of: a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Clause 27. The first UE of any of clauses 23 to 26, wherein the sensor data is transmitted via a Bluetooth Low Energy (BLE) secure link, a BLE High Accuracy Distance Measurement (HADM) link, an Ultra Wideband (UWB) link, a Wi-Fi link, or a 5G New Radio (NR) link.

Clause 28. The first UE of any of clauses 23 to 27, wherein the sensor data is transmitted via an encrypted Ultra Wideband (UWB) frame or an encrypted Wi-Fi frame.

Clause 29. The first UE of any of clauses 23 to 28, wherein the ranging procedure corresponds to a Fine Timing Measurement (FTM) ranging procedure, and wherein the sensor data is transmitted via an FTM Request frame or an FTM frame.

Clause 30. The first UE of any of clauses 25 to 29, wherein the ranging procedure corresponds to an IEEE 802.11az-based ranging procedure, and wherein the sensor data is transmitted via an initial FTM Request (iFTMR) frame or an initial FTM (iFTM) frame or a Location Measurement Report (LMR) frame.

Clause 31. The first UE of any of clauses 23 to 30, wherein the transmission of the sensor data is triggered in response to initiating of the ranging procedure, or wherein the transmission of the sensor data is triggered in response to a distance between the first UE and the second UE being less than a distance threshold.

Clause 32. A second user equipment (UE), comprising: a memory; at least one transceiver; and at least one processor communicatively coupled to the memory and the at least one transceiver, the at least one processor configured to: perform a ranging procedure with a first UE, the ranging procedure comprising communication of one or more ranging signals between the first UE and the second UE; receive, via the at least one transceiver, sensor data from the first UE in association with the ranging procedure; and determine a distance between the first UE and the second UE based on ranging measurement data associated with the one or more ranging signals and the sensor data.

Clause 33. The second UE of clause 32, wherein the at least one processor is further configured to: temporally align the ranging measurement data with the sensor data, wherein the distance is determined based at least in part on the temporally aligned ranging measurement data and the temporally aligned sensor data.

Clause 34. The second UE of clause 33, wherein the temporal alignment is performed via interpolation or extrapolation of the ranging measurement data, the sensor data, or a combination thereof, or wherein the temporal alignment is performed via selection of one or more sensor data samples that are within a threshold period of time from one or more ranging measurement samples.

Clause 35. The second UE of any of clauses 32 to 34, wherein the distance is determined based on Kalman filtering.

Clause 36. The second UE of clause 35, wherein a zero input is provided to the Kalman filtering to represent the sensor data when the sensor data is unavailable, or wherein different Kalman filtering that does not require sensor data input is implemented when the sensor data is unavailable.

Clause 37. The second UE of any of clauses 32 to 36, wherein the first UE corresponds to a pedestrian UE (PUE), and wherein the second UE corresponds to a vehicle UE (VUE).

Clause 38. The second UE of clause 37, wherein the ranging procedure is associated with a Digital Key procedure.

Clause 39. The second UE of any of clauses 32 to 38, wherein the sensor data is associated with one or more of: a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Clause 40. The second UE of any of clauses 32 to 39, wherein the sensor data is received via a Bluetooth Low Energy (BLE) secure link, a BLE High Accuracy Distance Measurement (HADM) link, an Ultra Wideband (UWB) link, a Wi-Fi link, or a 5G New Radio (NR) link.

Clause 41. The second UE of any of clauses 32 to 40, wherein the sensor data is received via an encrypted Ultra Wideband (UWB) frame or an encrypted Wi-Fi frame.

Clause 42. The second UE of any of clauses 32 to 41, wherein the ranging procedure corresponds to a Fine Timing Measurement (FTM) ranging procedure, and wherein the sensor data is received via an FTM Request frame or an FTM frame.

Clause 43. The second UE of clause 42, wherein the ranging procedure corresponds to an IEEE 802.11az-based ranging procedure, and wherein the sensor data is received via an initial FTM Request (iFTMR) frame or an initial FTM (iFTM) frame or a Location Measurement Report (LMR) frame.

Clause 44. The second UE of clause 43, wherein the reception of the sensor data is triggered in response to initiating of the ranging procedure, or wherein the reception of the sensor data is triggered in response to a distance between the first UE and the second UE being less than a distance threshold.

Clause 45. A first user equipment (UE), comprising: means for performing a ranging procedure with a second UE, the ranging procedure comprising communication of one or more ranging signals between the first UE and the second UE; means for obtaining sensor data via a set of sensors coupled to the first UE; and means for transmitting the sensor data to the second UE in association with the ranging procedure.

Clause 46. The first UE of clause 45, wherein the first UE corresponds to a pedestrian UE (PUE), and wherein the second UE corresponds to a vehicle UE (VUE).

Clause 47. The first UE of clause 46, wherein the ranging procedure is associated with a Digital Key procedure.

Clause 48. The first UE of any of clauses 45 to 47, wherein the sensor data is associated with one or more of: a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Clause 49. The first UE of any of clauses 45 to 48, wherein the sensor data is transmitted via a Bluetooth Low Energy (BLE) secure link, a BLE High Accuracy Distance Measurement (HADM) link, an Ultra Wideband (UWB) link, a Wi-Fi link, or a 5G New Radio (NR) link.

Clause 50. The first UE of any of clauses 45 to 49, wherein the sensor data is transmitted via an encrypted Ultra Wideband (UWB) frame or an encrypted Wi-Fi frame.

Clause 51. The first UE of any of clauses 45 to 50, wherein the ranging procedure corresponds to a Fine Timing Measurement (FTM) ranging procedure, and wherein the sensor data is transmitted via an FTM Request frame or an FTM frame.

Clause 52. The first UE of any of clauses 47 to 51, wherein the ranging procedure corresponds to an IEEE 802.11az-based ranging procedure, and wherein the sensor data is transmitted via an initial FTM Request (iFTMR) frame or an initial FTM (iFTM) frame or a Location Measurement Report (LMR) frame.

Clause 53. The first UE of any of clauses 45 to 52, wherein the transmission of the sensor data is triggered in response to initiating of the ranging procedure, or wherein the transmission of the sensor data is triggered in response to a distance between the first UE and the second UE being less than a distance threshold.

Clause 54. A second user equipment (UE), comprising: means for performing a ranging procedure with a first UE, the ranging procedure comprising communication of one or more ranging signals between the first UE and the second UE; means for receiving sensor data from the first UE in association with the ranging procedure; and means for determining a distance between the first UE and the second UE based on ranging measurement data associated with the one or more ranging signals and the sensor data.

Clause 55. The second UE of clause 54, further comprising: means for temporally aligning the ranging measurement data with the sensor data, wherein the distance is determined based at least in part on the temporally aligned ranging measurement data and the temporally aligned sensor data.

Clause 56. The second UE of clause 55, wherein the temporal alignment is performed via interpolation or extrapolation of the ranging measurement data, the sensor data, or a combination thereof, or wherein the temporal alignment is performed via selection of one or more sensor data samples that are within a threshold period of time from one or more ranging measurement samples.

Clause 57. The second UE of any of clauses 54 to 56, wherein the distance is determined based on Kalman filtering.

Clause 58. The second UE of clause 57, wherein a zero input is provided to the Kalman filtering to represent the sensor data when the sensor data is unavailable, or wherein different Kalman filtering that does not require sensor data input is implemented when the sensor data is unavailable.

Clause 59. The second UE of any of clauses 54 to 58, wherein the first UE corresponds to a pedestrian UE (PUE), and wherein the second UE corresponds to a vehicle UE (VUE).

Clause 60. The second UE of clause 59, wherein the ranging procedure is associated with a Digital Key procedure.

Clause 61. The second UE of any of clauses 54 to 60, wherein the sensor data is associated with one or more of: a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Clause 62. The second UE of any of clauses 54 to 61, wherein the sensor data is received via a Bluetooth Low Energy (BLE) secure link, a BLE High Accuracy Distance Measurement (HADM) link, an Ultra Wideband (UWB) link, a Wi-Fi link, or a 5G New Radio (NR) link.

Clause 63. The second UE of any of clauses 54 to 62, wherein the sensor data is received via an encrypted Ultra Wideband (UWB) frame or an encrypted Wi-Fi frame.

Clause 64. The second UE of any of clauses 54 to 63, wherein the ranging procedure corresponds to a Fine Timing Measurement (FTM) ranging procedure, and wherein the sensor data is received via an FTM Request frame or an FTM frame.

Clause 65. The second UE of clause 64, wherein the ranging procedure corresponds to an IEEE 802.11az-based ranging procedure, and wherein the sensor data is received via an initial FTM Request (iFTMR) frame or an initial FTM (iFTM) frame or a Location Measurement Report (LMR) frame.

Clause 66. The second UE of clause 65, wherein the reception of the sensor data is triggered in response to initiating of the ranging procedure, or wherein the reception of the sensor data is triggered in response to a distance between the first UE and the second UE being less than a distance threshold.

Clause 67. A non-transitory computer-readable medium storing computer-executable instructions that, when executed by a first user equipment (UE), cause the first UE to: perform a ranging procedure with a second UE, the ranging procedure comprising communication of one or more ranging signals between the first UE and the second UE; obtain sensor data via a set of sensors coupled to the first UE; and transmit the sensor data to the second UE in association with the ranging procedure.

Clause 68. The non-transitory computer-readable medium of clause 67, wherein the first UE corresponds to a pedestrian UE (PUE), and wherein the second UE corresponds to a vehicle UE (VUE).

Clause 69. The non-transitory computer-readable medium of clause 68, wherein the ranging procedure is associated with a Digital Key procedure.

Clause 70. The non-transitory computer-readable medium of any of clauses 67 to 69, wherein the sensor data is associated with one or more of: a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Clause 71. The non-transitory computer-readable medium of any of clauses 67 to 70, wherein the sensor data is transmitted via a Bluetooth Low Energy (BLE) secure link, a BLE High Accuracy Distance Measurement (HADM) link, an Ultra Wideband (UWB) link, a Wi-Fi link, or a 5G New Radio (NR) link.

Clause 72. The non-transitory computer-readable medium of any of clauses 67 to 71, wherein the sensor data is transmitted via an encrypted Ultra Wideband (UWB) frame or an encrypted Wi-Fi frame.

Clause 73. The non-transitory computer-readable medium of any of clauses 67 to 72, wherein the ranging procedure corresponds to a Fine Timing Measurement (FTM) ranging procedure, and wherein the sensor data is transmitted via an FTM Request frame or an FTM frame.

Clause 74. The non-transitory computer-readable medium of any of clauses 69 to 73, wherein the ranging procedure corresponds to an IEEE 802.11az-based ranging procedure, and wherein the sensor data is transmitted via an initial FTM Request (iFTMR) frame or an initial FTM (iFTM) frame or a Location Measurement Report (LMR) frame.

Clause 75. The non-transitory computer-readable medium of any of clauses 67 to 74, wherein the transmission of the sensor data is triggered in response to initiating of the ranging procedure, or wherein the transmission of the sensor data is triggered in response to a distance between the first UE and the second UE being less than a distance threshold.

Clause 76. A non-transitory computer-readable medium storing computer-executable instructions that, when executed by a second user equipment (UE), cause the second UE to: perform a ranging procedure with a first UE, the ranging procedure comprising communication of one or more ranging signals between the first UE and the second UE; receive sensor data from the first UE in association with the ranging procedure; and determine a distance between the first UE and the second UE based on ranging measurement data associated with the one or more ranging signals and the sensor data.

Clause 77. The non-transitory computer-readable medium of clause 76, further comprising computer-executable instructions that, when executed by the second UE, cause the second UE to: temporally align the ranging measurement data with the sensor data, wherein the distance is determined based at least in part on the temporally aligned ranging measurement data and the temporally aligned sensor data.

Clause 78. The non-transitory computer-readable medium of clause 77, wherein the temporal alignment is performed via interpolation or extrapolation of the ranging measurement data, the sensor data, or a combination thereof, or wherein the temporal alignment is performed via selection of one or more sensor data samples that are within a threshold period of time from one or more ranging measurement samples.

Clause 79. The non-transitory computer-readable medium of any of clauses 76 to 78, wherein the distance is determined based on Kalman filtering.

Clause 80. The non-transitory computer-readable medium of clause 79, wherein a zero input is provided to the Kalman filtering to represent the sensor data when the sensor data is unavailable, or wherein different Kalman filtering that does not require sensor data input is implemented when the sensor data is unavailable.

Clause 81. The non-transitory computer-readable medium of any of clauses 76 to 80, wherein the first UE corresponds to a pedestrian UE (PUE), and wherein the second UE corresponds to a vehicle UE (VUE).

Clause 82. The non-transitory computer-readable medium of clause 81, wherein the ranging procedure is associated with a Digital Key procedure.

Clause 83. The non-transitory computer-readable medium of any of clauses 76 to 82, wherein the sensor data is associated with one or more of: a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

Clause 84. The non-transitory computer-readable medium of any of clauses 76 to 83, wherein the sensor data is received via a Bluetooth Low Energy (BLE) secure link, a BLE High Accuracy Distance Measurement (HADM) link, an Ultra Wideband (UWB) link, a Wi-Fi link, or a 5G New Radio (NR) link.

Clause 85. The non-transitory computer-readable medium of any of clauses 76 to 84, wherein the sensor data is received via an encrypted Ultra Wideband (UWB) frame or an encrypted Wi-Fi frame.

Clause 86. The non-transitory computer-readable medium of any of clauses 76 to 85, wherein the ranging procedure corresponds to a Fine Timing Measurement (FTM) ranging procedure, and wherein the sensor data is received via an FTM Request frame or an FTM frame.

Clause 87. The non-transitory computer-readable medium of clause 86, wherein the ranging procedure corresponds to an IEEE 802.11az-based ranging procedure, and wherein the sensor data is received via an initial FTM Request (iFTMR) frame or an initial FTM (iFTM) frame or a Location Measurement Report (LMR) frame.

Clause 88. The non-transitory computer-readable medium of clause 87, wherein the reception of the sensor data is triggered in response to initiating of the ranging procedure, or wherein the reception of the sensor data is triggered in response to a distance between the first UE and the second UE being less than a distance threshold.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a second user equipment (UE), comprising:

performing a ranging procedure with a first UE, the ranging procedure comprising communication of one or more ranging signals between the first UE and the second UE;

receiving sensor data from the first UE in association with the ranging procedure;

determining a distance between the first UE and the second UE based on ranging measurement data associated with the one or more ranging signals and the sensor data; and temporally aligning the ranging measurement data with the sensor data, wherein the distance is determined based at least in part on the temporally aligned ranging measurement data and the temporally aligned sensor data.

2. The method of claim 1, wherein the temporal alignment is performed via interpolation or extrapolation of the ranging measurement data, the sensor data, or a combination thereof, or wherein the temporal alignment is performed via selection of one or more sensor data samples that are within a threshold period of time from one or more ranging measurement samples.

3. The method of claim 1, wherein the distance is further determined based on Kalman filtering.

4. The method of claim 3, wherein a zero input is provided to the Kalman filtering to represent the sensor data when the sensor data is unavailable, or wherein different Kalman filtering that does not require sensor data input is implemented when the sensor data is unavailable.

5. The method of claim 1, wherein the first UE corresponds to a pedestrian UE (PUE), and wherein the second UE corresponds to a vehicle UE (VUE).

6. The method of claim 5, wherein the ranging procedure is associated with a Digital Key procedure.

7. The method of claim 1, wherein the sensor data is associated with one or more of:

a velocity or speed of the first UE, or acceleration of the first UE, or an orientation of the first UE, or one or more timestamps associated with the velocity or speed of the first UE, the acceleration of the first UE, or the orientation of the first UE, or any combination thereof.

8. The method of claim 1, wherein the sensor data is received via an Ultra Wideband (UWB) link, or a 5G New Radio (NR) link.

9. The method of claim 1, wherein the sensor data is received via an encrypted Ultra Wideband (UWB) frame or an encrypted Wi-Fi frame.

10. The method of claim 1, wherein the ranging procedure corresponds to a Fine Timing Measurement (FTM) ranging procedure, and wherein the sensor data is received via an FTM Request frame or an FTM frame.

11. The method of claim 10, wherein the ranging procedure corresponds to an IEEE 802.11az-based ranging procedure, and wherein the sensor data is received via an initial FTM Request (iFTMR) frame or an initial FTM (iFTM) frame or a Location Measurement Report (LMR) frame.

12. The method of claim 11,
wherein the reception of the sensor data is triggered in response to initiating of the ranging procedure, or
wherein the reception of the sensor data is triggered in response to a distance between the first UE and the second UE being less than a distance threshold.

13. A second user equipment (UE), comprising:
a memory;
at least one transceiver; and
at least one processor communicatively coupled to the memory and the at least one transceiver, the at least one processor configured to:
perform a ranging procedure with a first UE, the ranging procedure comprising communication of one or more ranging signals between the first UE and the second UE;
receive, via the at least one transceiver, sensor data from the first UE in association with the ranging procedure;
determine a distance between the first UE and the second UE based on ranging measurement data associated with the one or more ranging signals and the sensor data, and
temporally align the ranging measurement data with the sensor data, wherein the distance is determined based at least in part on the temporally aligned ranging measurement data and the temporally aligned sensor data.

14. The second UE of claim 13,
wherein the temporal alignment is performed via interpolation or extrapolation of the ranging measurement data, the sensor data, or a combination thereof, or
wherein the temporal alignment is performed via selection of one or more sensor data samples that are within a threshold period of time from one or more ranging measurement samples.

15. The second UE of claim 13, wherein the distance is further determined based on Kalman filtering.

16. The second UE of claim 15,
wherein a zero input is provided to the Kalman filtering to represent the sensor data when the sensor data is unavailable, or
wherein different Kalman filtering that does not require sensor data input is implemented when the sensor data is unavailable.

17. The second UE of claim 13,
wherein the first UE corresponds to a pedestrian UE (PUE), and
wherein the second UE corresponds to a vehicle UE (VUE).

18. The second UE of claim 17, wherein the ranging procedure is associated with a Digital Key procedure.

19. The second UE of claim 13, wherein the sensor data is associated with one or more of:
a velocity or speed of the first UE, or
acceleration of the first UE, or
an orientation of the first UE, or
one or more timestamps associated with the velocity or speed of the first UE, the acceleration of the first UE, or the orientation of the first UE, or
any combination thereof.

20. The second UE of claim 13, wherein the sensor data is received via an Ultra Wideband (UWB) link, or a 5G New Radio (NR) link.

21. The second UE of claim 13, wherein the sensor data is received via an encrypted Ultra Wideband (UWB) frame or an encrypted Wi-Fi frame.

22. The second UE of claim 13,
wherein the ranging procedure corresponds to a Fine Timing Measurement (FTM) ranging procedure, and
wherein the sensor data is received via an FTM Request frame or an FTM frame.

23. The second UE of claim 22,
wherein the ranging procedure corresponds to an IEEE 802.11az-based ranging procedure, and
wherein the sensor data is received via an initial FTM Request (iFTMR) frame or an initial FTM (iFTM) frame or a Location Measurement Report (LMR) frame.

24. The second UE of claim 23,
wherein the reception of the sensor data is triggered in response to initiating of the ranging procedure, or
wherein the reception of the sensor data is triggered in response to a distance between the first UE and the second UE being less than a distance threshold.

25. A second user equipment (UE), comprising:
a memory means for storage;
at least one transceiver means for transceiving; and
at least one means for processing communicatively coupled to the means for storage and the at least one means for transceiving, the at least one processing means configured to:
perform a ranging procedure with a first UE, the ranging procedure comprising communication of one or more ranging signals between the first UE and the second UE;
receive, via the at least one transceiver means, sensor data from the first UE in association with the ranging procedure;
determine a distance between the first UE and the second UE based on ranging measurement data associated with the one or more ranging signals and the sensor data, and
temporally align the ranging measurement data with the sensor data, wherein the distance is determined based at least in part on the temporally aligned ranging measurement data and the temporally aligned sensor data.

26. The second UE of claim 25,
wherein the temporal alignment is performed via interpolation or extrapolation of the ranging measurement data, the sensor data, or a combination thereof, or
wherein the temporal alignment is performed via selection of one or more sensor data samples that are within a threshold period of time from one or more ranging measurement samples.

27. The second UE of claim 25, wherein the distance is further determined based on Kalman filtering.

28. The second UE of claim 27,
wherein a zero input is provided to the Kalman filtering to represent the sensor data when the sensor data is unavailable, or
wherein different Kalman filtering that does not require sensor data input is implemented when the sensor data is unavailable.

29. The second UE of claim 25,
wherein the first UE corresponds to a pedestrian UE (PUE), and
wherein the second UE corresponds to a vehicle UE (VUE).

30. The second UE of claim 29, wherein the ranging procedure is associated with a Digital Key procedure.

31. The second UE of claim 25, wherein the sensor data is associated with one or more of:

a velocity or speed of the first UE, or
acceleration of the first UE, or
an orientation of the first UE, or
one or more timestamps associated with the velocity or speed of the first UE, the acceleration of the first UE, or the orientation of the first UE, or
any combination thereof.

32. The second UE of claim 25, wherein the sensor data is received via a an Ultra Wideband (UWB) link, or a 5G New Radio (NR) link.

33. The second UE of claim 25, wherein the sensor data is received via an encrypted Ultra Wideband (UWB) frame or an encrypted Wi-Fi frame.

34. The second UE of claim 25,
wherein the ranging procedure corresponds to a Fine Timing Measurement (FTM) ranging procedure, and
wherein the sensor data is received via an FTM Request frame or an FTM frame.

35. The second UE of claim 34,
wherein the ranging procedure corresponds to an IEEE 802.11az-based ranging procedure, and
wherein the sensor data is received via an initial FTM Request (iFTMR) frame or an initial FTM (iFTM) frame or a Location Measurement Report (LMR) frame.

36. The second UE of claim 35,
wherein the reception of the sensor data is triggered in response to initiating of the ranging procedure, or
wherein the reception of the sensor data is triggered in response to a distance between the first UE and the second UE being less than a distance threshold.

37. The storage medium of claim 36,
wherein the ranging procedure corresponds to an IEEE 802.11az-based ranging procedure, and
wherein the sensor data is received via an initial FTM Request (iFTMR) frame or an initial FTM (iFTM) frame or a Location Measurement Report (LMR) frame.

38. The storage medium of claim 37,
wherein the reception of the sensor data is triggered in response to initiating of the ranging procedure, or
wherein the reception of the sensor data is triggered in response to a distance between the first UE and the second UE being less than a distance threshold.

39. A non-transitory, processor-readable storage medium comprising processor-readable instructions configured to cause a processor of a second user equipment (UE) to,
perform a ranging procedure with a first UE, the ranging procedure comprising communication of one or more ranging signals between the first UE and the second UE;
receive sensor data from the first UE in association with the ranging procedure;

determine a distance between the first UE and the second UE based on ranging measurement data associated with the one or more ranging signals and the sensor data, and
temporally align the ranging measurement data with the sensor data, wherein the distance is determined based at least in part on the temporally aligned ranging measurement data and the temporally aligned sensor data.

40. The storage medium of claim 39,
wherein the temporal alignment is performed via interpolation or extrapolation of the ranging measurement data, the sensor data, or a combination thereof, or
wherein the temporal alignment is performed via selection of one or more sensor data samples that are within a threshold period of time from one or more ranging measurement samples.

41. The storage medium of claim 39, wherein the distance is further determined based on Kalman filtering.

42. The storage medium of claim 41,
wherein a zero input is provided to the Kalman filtering to represent the sensor data when the sensor data is unavailable, or
wherein different Kalman filtering that does not require sensor data input is implemented when the sensor data is unavailable.

43. The storage medium of claim 39
wherein the first UE corresponds to a pedestrian UE (PUE), and
wherein the second UE corresponds to a vehicle UE (VUE).

44. The storage medium of claim 43, wherein the ranging procedure is associated with a Digital Key procedure.

45. The storage medium of claim 39, wherein the sensor data is associated with one or more of:
a velocity or speed of the first UE, or
acceleration of the first UE, or
an orientation of the first UE, or
one or more timestamps associated with the velocity or speed of the first UE, the acceleration of the first UE, or the orientation of the first UE, or
any combination thereof.

46. The storage medium of claim 39, wherein the sensor data is received via a an Ultra Wideband (UWB) link, or a 5G New Radio (NR) link.

47. The storage medium of claim 39, wherein the sensor data is received via an encrypted Ultra Wideband (UWB) frame or an encrypted Wi-Fi frame.

48. The storage medium of claim 39,
wherein the ranging procedure corresponds to a Fine Timing Measurement (FTM) ranging procedure, and
wherein the sensor data is received via an FTM Request frame or an FTM frame.

* * * * *